United States Patent [19]

Carroll

[11] Patent Number: 4,464,264

[45] Date of Patent: Aug. 7, 1984

[54] CYCLONE SEPARATOR

[76] Inventor: Noel Carroll, Sherbrooke Rd., Sherbrooke, Victoria, Australia

[21] Appl. No.: 449,395

[22] Filed: Dec. 13, 1982

[30] Foreign Application Priority Data

| Mar. 4, 1982 [AU] | Australia | PF2973 |
| Mar. 11, 1982 [AU] | Australia | PF3061 |
| May 14, 1982 [AU] | Australia | PF4016 |
| May 14, 1982 [AU] | Australia | PF4017 |
| Aug. 10, 1982 [AU] | Australia | PF5314 |

[51] Int. Cl.³ .................................. B04C 5/081
[52] U.S. Cl. ........................... 210/512.1; 209/144; 209/211
[58] Field of Search .............. 210/788, 512.1, 322, 210/252, 261, 262; 209/211, 144; 55/447

[56] References Cited

U.S. PATENT DOCUMENTS

4,237,006 12/1980 Colman et al. .................. 210/788

Primary Examiner—Frank Sever

[57] ABSTRACT

Cyclone separator having a separating chamber with first, second and third contiguous cylindrical portions arranged in that order and of progressively decreasing diameter, tangential feed inlets to the first cylindrical portion and two outlets each arranged axially and one extending from the first cylindrical portion and the other from the third cylindrical portion. The cyclone separator has a fourth cylindrical portion leading from the outlet from the third cylindrical portion and arranged to provide a constriction against flow therethrough. The outlet from the first cylindrical portion has a flow blockage clearing means operable, under the condition of blockage of that outlet by debris to open up the area available for outflow to facilitate clearance of the blockage.

31 Claims, 17 Drawing Figures

CYCLONE SEPARATOR

BACKGROUND OF THE INVENTION (i) Field of the Invention
This invention relates to cyclone separators.
(ii) Prior Art
U.S. Pat. No. 4,237,006 (Colman et al) describes a cyclone separator having a separating chamber having first, second and third contiguous cylindrical portions arranged in that order, the first cylindrical portion being of greater diameter than the second cylindrical portion and the third cylindrical portion being of lesser diameter than the second cylindrical portion, the first cylindrical portion having an overflow outlet at the end thereof opposite to said second cylindrical portion and a plurality of tangentially directed feed inlets, the separator being adapted to separate liquids one from the other in a mixture when infed into said separating chamber via said feed inlets, one said liquid emerging from said overflow outlet and the other emerging from the end of said third cylindrical portion remote from said first cylindrical portion.

The above separator is intended specifically, but not exclusively, for separating oil from water, the oil in use emerging from the overflow outlet and the water from said third cylindrical portion.

The aforementioned cylindrical portions may not be truly cylindrical, in the sense that they do not need in all cases to present a side surface which is linear in cross-section and parallel to the axis thereof. For example, U.S. Pat. No. 4,237,006 describes arrangements wherein the first cylindrical portion has a frustoconical section adjacent the second cylindrical portion and which provides a taper between the largest diameter of the first cylindrical portion and the diameter of the second cylindrical portion where this meets the first cylindrical portion. Likewise, the aforementioned patent specification describes arrangements wherein a similar section of frustoconical form is provided to cause a tapering in the diameter of the second cylindrical portion from a largest diameter of the second cylindrical portion to the diameter of the third cylindrical portion. There is also described an arrangement wherein the second cylindrical portion exhibits a constant taper over its whole length.

A difficulty has been found in operating cyclone separators of the kind described in U.S. Pat. No. 4,237,006 in that proper and reliable separating action is not always achieved, and contamination of the heavier liquid component (that emerging from the aforementioned third cylindrical portion of the separator) with the lighter liquid component occurs.

BRIEF DESCRIPTION OF THE INVENTION

In U.S. Pat. No. 4,237,006, the described cyclone separator is said to comply with a number of dimensional restrictions insofar as the relative proportions of various components thereof are concerned. These constraints are:

$10 \leq l_2/d_2 \leq 25$ $0.04 \leq 4A_i/\pi d_1^2 \leq 0.10$ $0.1 \leq d_o/d_2 \leq 0.25$ $d_1 > d_2$ $d_2 > d_3$ wherein $d_o$ is the internal diameter of said overflow outlet, $d_1$ is the diameter of the first portion, $d_2$ is the diameter of the second portion and $d_3$ is the diameter of the third portion, $l_2$ is the length of the second portion, $A_i$ is the total cross-sectional area of all of the feed inlets measured at the points of entry into the separating chamber normal to the inlet flow.

The cyclone separator of this invention is designed specifically for separation of a lighter oil component from a heavier water component in an oil-water mixture. The separator has a separating chamber which may be of a form like that described in U.S. Pat. No. 4,237,006, in particular having first, second and third cylindrical portions of progressively decreasing diameters and with the largest diameter portion having preferably two feed inlets for the oil-water mixture to be separated. As taught in U.S. Pat. No. 4,237,006, the second cylindrical portion is of relatively long length. An overflow outlet is provided on the axis of the separator for takeoff of the lighter oil component of the liquid mixture to be separated. The heavier water component travels along the separating chamber to emerge from the end of the third cylindrical portion which is remote from the first cylindrical portion. The invention is characterized by the provision of a fourth portion of the separating chamber being positioned to receive the heavier component flow from the third cylindrical portion. This fourth portion which may be of cylindrical configuration is arranged to present a passageway which is designed sized and arranged to avoid contamination of the emergent water component by the oil component. The passageway so formed is configured so as to present a passageway for throughflow of said water component, the diameter of which passageway decreases away from the said third cylindrical portion to a diameter in the range $\frac{1}{3}$ to $\frac{2}{3}$ of the diameter of the fourth portion at the junction of said fourth portion with said third cylindrical portion.

It has been found that without the provision of a fourth portion of the separating chamber, so characterized, proper operation of the cyclone separator is not obtained and incomplete separation only of the components of the liquid mixture admitted to the separating chamber will be effected. The fourth portion may be of various forms being selected in any event to provide the necessary flow resistance. In particular, the fourth portion may have a part adjacent the third portion of the separating chamber which exhibits a decreasing diameter along its length away from the third cylindrical portion to an outlet aperture at the end of the part remote from the third cylindrical portion. The fourth portion may also include an outlet pipe extending from that outlet aperture. Generally, the aforementioned part of the fourth portion may be of generally frustoconical configuration. It has been found satisfactory to form the said part of the fourth portion such that it has a maximum diameter adjacent the junction with the third cylindrical portion which is equal to the diameter of the third portion at that junction. However, said part of the fourth portion may exhibit other forms, such as having a side wall which exhibits a curvature such that, when viewed in cross-section, the angle which a tangent to the side wall makes with respect to the axis of the fourth portion becomes less acute in the direction away from the junction between the third cylindrical portion and said fourth portion, or where such angle becomes more acute in the last-mentioned direction. The outlet pipe may be of cylindrical form having a diameter which is substantially constant.

It has been found that, generally speaking, the dimensional constraints mentioned in U.S. Pat. No. 4,237,006 may be applied to cyclone separators constructed in accordance with this invention. It has not been found necessary though to comply with the constraint concerning the ratio of the overflow outlet diameter to the diameter of the second cylindrical portion.

Preferably, the half angle or angle of the interior surface of said part of fourth portion as measured to the axis of the fourth portion may be 45°, where said part is of frustoconical form. Generally speaking, too, even where the form of the wall of said part of the fourth portion varies from frustoconical, the fourth portion may be approximately as long as it is in diameter at its maximum diameter end.

The invention is further described with reference to the accompanying drawings in which.

Figure 1:
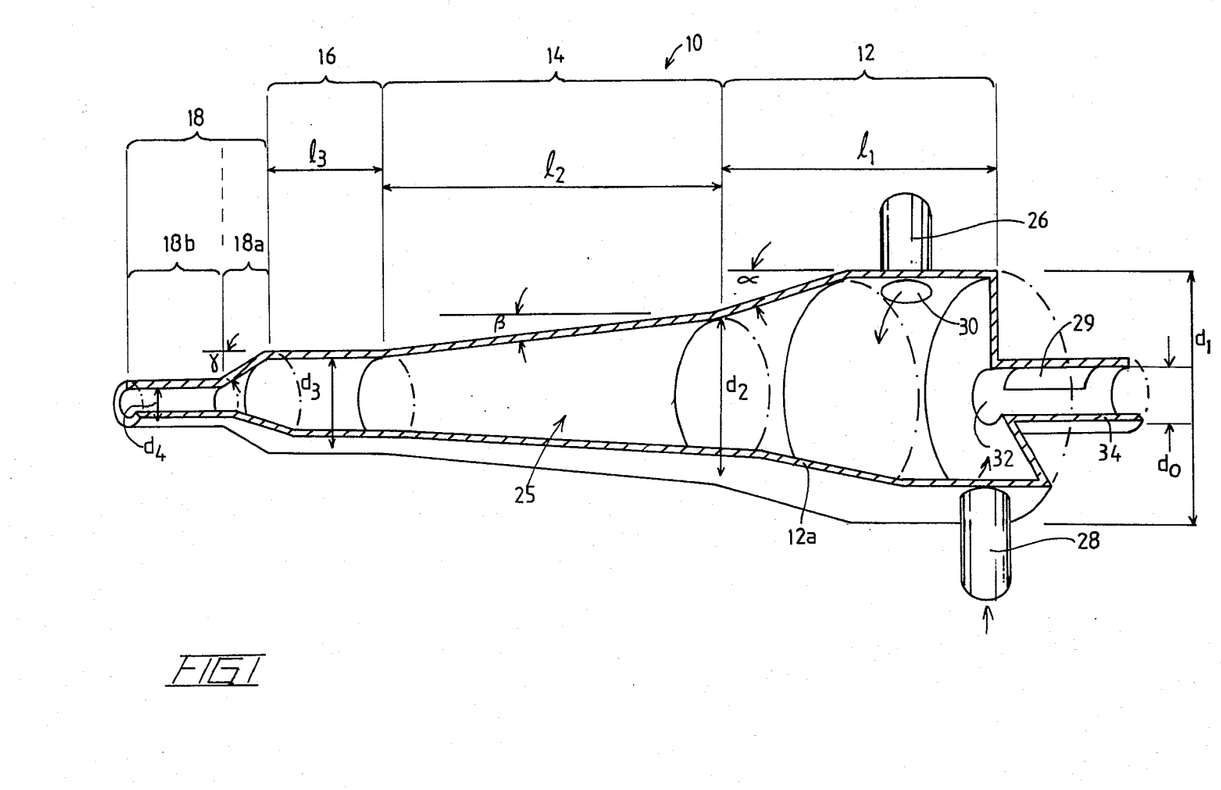
FIG. 1 is a cutaway perspective view of a cyclone separator constructed in accordance with this invention.

The separator 10 shown in FIG. 1 has a separating chamber 25 having first, second and third cylindrical portions 12, 14 and 16 coaxially arranged in that order. These chambers are generally similar to the corresponding first, second and third cylindrical portions of the separating chamber of the cyclone separator described in the aforementioned U.S. Pat. No. 4,237,006, the disclosures of which are hereby incorporated into the present specification to form part thereof. Most particularly, the first cylindrical portion 12 has two feed pipes 26, 28 associated therewith, these being arranged to feed tangentially into the cylindrical portion 12 via respective inlet apertures of which only one aperture, namely aperture 30 associated with pipe 26, is visible in the drawing. The two feed inlet apertures are diametrically arranged one relative to the other and positioned close to the end of portion 12 remote from portion 14. The end of portion 12 remote from portion 14 also has a circular outlet opening 32 which leads to an overflow outlet pipe 34.

Cylindrical portion 12 is not of constant diameter over its whole length, the part 12a thereof adjacent portion 14 exhibiting a taper towards the second cylindrical portion 14. As explained in U.S. Pat. No. 4,237,006 however, such tapered section is not essential.

The second cylindrical portion 14 exhibits a taper over its length, tapering from a diameter at the end adjacent section 12 equal to the diameter of portion 12 at the junction between the two portions to a somewhat lesser dimension at its opposite end. Cylindrical portion 16 is a constant diameter equal to the minimum diameter of portion 14.

In the drawing, the length $l_1$ of portion 12, its diameter $d_1$, the taper angle $\alpha$ of the tapered part of cylindrical portion 12, the diameter $d_o$ of the outlet pipe 34, the length and diameter $l_2$, $d_2$ of the second portion 14, the taper angle $\beta$ of the second portion 14 and the length $l_3$ and diameter $d_3$ of the third cylindrical portion, as well as the total area $A_i$ of the two feed inlet apertures 30 may all be selected in accordance with the parameters mentioned in U.S. Pat. No. 4,237,006 save that the outlet diameter $d_o$ need not constrained be as described therein.

In accordance with this invention, a fourth portion is added to the separating chamber 25, this portion being designated by reference numeral 18 in the figure. Portion 18 has a part 18a adjacent portion 16 which is of frustoconical configuration, tapering from a maximum diameter equal to $d_3$ at its end closest to and adjoining to the outlet end of cylindrical portion 16, to a diameter $d_4$ at its outlet end. At the outlet end of part 18a, fourth portion 18 includes an outlet pipe 18b which is of diameter $d_4$.

Preferably, the angle $\alpha$, being the conicity or half-angle of the frustoconical surface of part 18a is about 45°, although angles in the range 30° to 60° are generally satisfactory. In any event, it is preferred that the ratio $d_4/d_3$ be in the range 1:3 to 2:3. The length of part 18a is not critical to the invention and in any event is normally fixed by the selection of the aforementioned ratio of diameters $d_4$ to $d_3$. Likewise, the length of the pipe 18b has not been found to be important to the operation of the invention.

Although part 18a is shown as having a truly frustoconical cross-sectional form (that is to say it is shown as having a side surface which exhibits a linear sloping configuration relative to the axis of the portion when viewed in section) this is not essential. The part 18 may have a conicity angle which varies along the length thereof such as either increasing or decreasing the direction from the greater diameter end to the lesser diameter end thereof. In any event, it is preferred that the length of the part 18 be roughly the same as the maximum diameter thereof.

In use, liquid to be separated is admitted tangentially to the interior of cylindrical portion 12 via feed pipes 26, 28, the denser component of the liquid then travelling lengthwise through the separator to emerge from pipe 18b, whilst the lighter component emerges from pipe 34.

Figure 2:
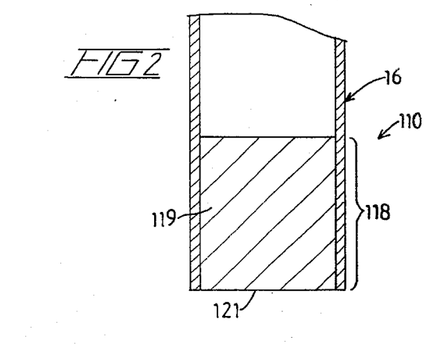
FIG. 2 is a fragmentary lengthwise section of a modified cyclone separator in accordance with the invention.

The modified cyclone separator 110 shown in FIG. 2 is identical to that shown in FIG. 1 save that the pipe 18b is omitted and a modified fourth portion 118 is provided instead of portion 18. Portion 118 is of the same diameter as portion 16 but is filled with sand particles 119 whereby to provide resistance to flow therethrough. The size and density of packing of sand particles and the length of portion 118 are selected to provide a resistance to flow similar to that provided by part 18a of portion 18. Where the separator 110 is vertical, the sand may be supported on a suitable meshing such as the meshing 121 shown. Otherwise suitable retaining meshing may be provided at either end of portion 118.

In a still further alternative construction (not shown) resistance to flow through portion 118 is provided by partial flattening of portion 118 or by retaining a suspended ball in a cage therein.

Figure 3:
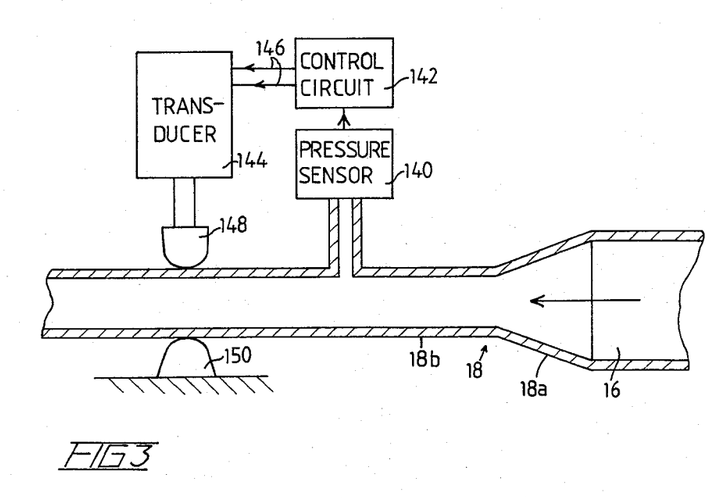
FIG. 3 is a fragmentary lengthwise section of another modified cyclone separator in accordance with the invention.
Figure 4:
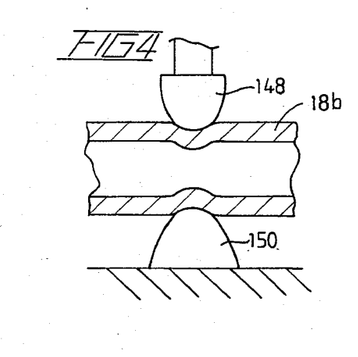
FIG. 4 is a scrap view corresponding to part of FIG. 3, but showing the separator in use.

In the modification shown in FIGS. 3 and 4, the pipe 18b is formed of a flexible tube. A pressure sensor 140 is provided connected to be sensitive to fluid pressure at the inlet end of the pipe 18b and to provide an electrical signal at its output which is representative of that pressure. A control circuit 142 is connected to receive signal from sensor 140 and to provide an output signal which is coupled to an electromechanical transducer 144 via lines 146 as shown. Transducer 144 might, for example, be in the form of a solenoid but in any event is of a kind having an element 148 which is capable of movement under control of the control circuit 142 so as to adopt a position which is dependent upon the fluid pressure as sensed by sensor 140. Element 148 is disposed to one side of the tube comprising pipe 18b and a fixed element 150 of somewhat similar configuration is provided immediately opposite element 148 and to the opposite side of the tube defining pipe 18b. The arrangement is such that, on detection of decrease of fluid pressure as sensed by sensor 140, control circuit 142 controls transducer 144 to move element 148 inwardly towards element 150 to constrict the pipe 18b, by deformation of the wall of the tube thereof as shown in FIG. 4. Thus, on detection of fluid pressure decrease, the cross-sectional area of pipe 18b is decreased. Correspondingly, if increase of pressure is detected by sensor 140, control circuit 142 moves element 148 away from element 150 to release the constriction to some extent. By this means, the resistance to flow presented by the pipe 18b can be varied in accordance with the determined pressure at the inlet end of the pipe 18b.

The above described arrangements for providing restriction to outflow from the separator have been found to be effective in ensuring adequate operation of the separator. More particularly, in the absence of such constriction, it is observed that, generally, the outflow via cylindrical portion 16 which should, for effectiveness of the separator, comprise only the more dense component the liquids to be separated, will tend to be contaminated with the lighter component liquid. It is believed that this effect arises because it is necessary to provide a "back pressure" for outflow via portion 16 and the described constrictions effectively provide such back pressure.

An experimental cyclone separator formed in accordance with FIG. 1 and having the portion 16 of diameter 29 mm, and an internal diameter of some 15 mm for cyclindrical portion 18 was found to be quite effective. In use, where the separator was used for separating oil and water (the water emerging from portion 16) it was found that the diameter of portion 18 would in some circumstances need to be descreased below the described 15 mm size, particularly where a larger amount of contaminant oil was present in the liquid fed to the separator for separation. Generally speaking, this reduced diameter was found to be effective where there was more than one percent oil in the input liquid. On the other hand, if the diameter of portion 18 is made too small, insufficient liquid may pass through the separator, causing unsatisfactory results. Of course, it is desirable to process the maximum amount of liquid in a given time. Again, if the diameter of portion 18 is too large, the operating pressure may drop in the separator causing poor separation.

As best shown in FIGS. 5 to 8, the outlet pipe 34 is provided with an area varying means 23 constructed in accordance with this invention. More particularly, the area varying means includes a segment 29 of the pipe 34 which is construted so as to be removable from the remainder 31 of the pipe 34. Segment 29 has part frustoconical end surfaces 33, 35 which in the closed condition of the segment shown in FIGS. 5 and 7 mate with corresponding part frustoconical surfaces 36, 38 of the remainder 31 of the pipe 34. The segment 29 also has two opposed side edge surfaces 40, 42 which mate with corresponding lengthwise extending edge surfaces 44, 46 on the pipe remainder 31.

A rod 48 is connected to the exterior of segment 29 and extends away therefrom at an angle relative to the axis of pipe 34, this angle corresponding roughly to the angle of surfaces 33, 35 as presented to the axis of the pipe 34 in a generally radial plane in which the rod 48 is contained. At its opposite end, rod 48 is connected to the plunger 50a of an electromagnet 50. A spring 54 is interposed between the body of the magnet 50 and an outstanding flange 48a on rod 48 and normally urges rod 48 away from the electromagnet 50 to the condition shown in FIGS. 5 and 7 at which the segment 29 neatly fits into the space in the pipe 34 defined by the surfaces 36, 38, 44 and 46. Although not shown, in order to facilitate sealing, the surfaces 33, 35 of the segment 29 may be made slightly convergent in the direction away from the outside surface of the segment 29 towards the axis of the pipe 34. Similarly, the surfaces 40 and 42 may be made convergent in the direction away from the outer surface of the segment 29 towards the axis of the pipe 34.

Figure 5:
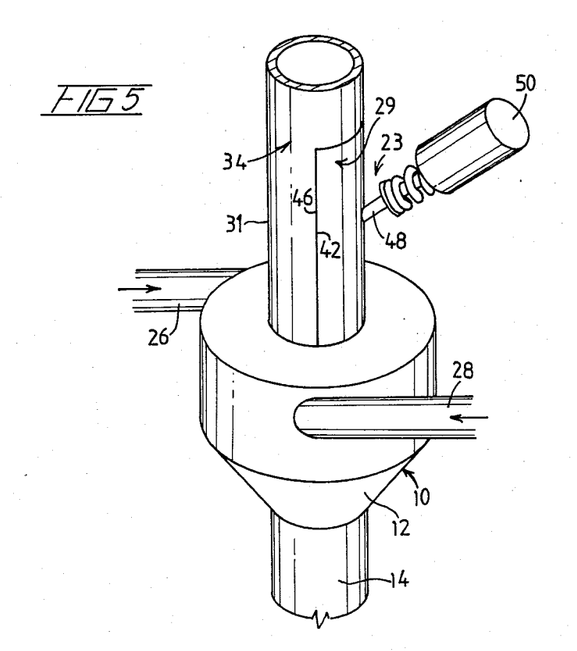
FIG. 5 is a fragmentary perspective view of the cyclone separator of FIG. 1 showing outlet area varying means in accordance with the invention.
Figure 6:
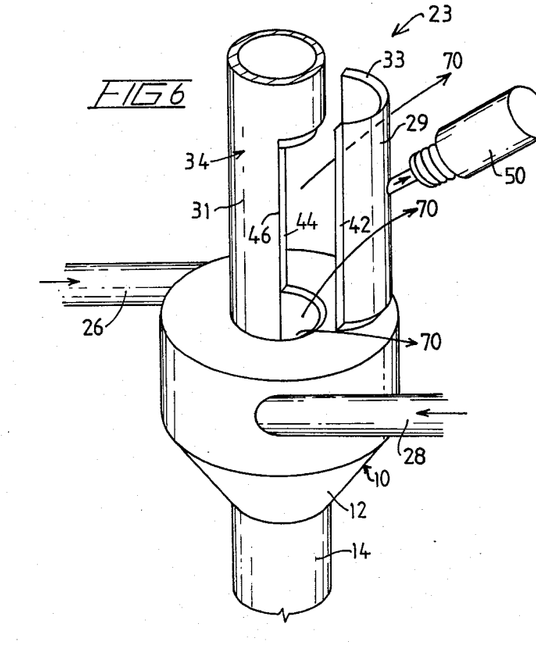
FIG. 6 is a view like FIG. 5 but showing the outlet area varying means operated.
Figures 7, 9:
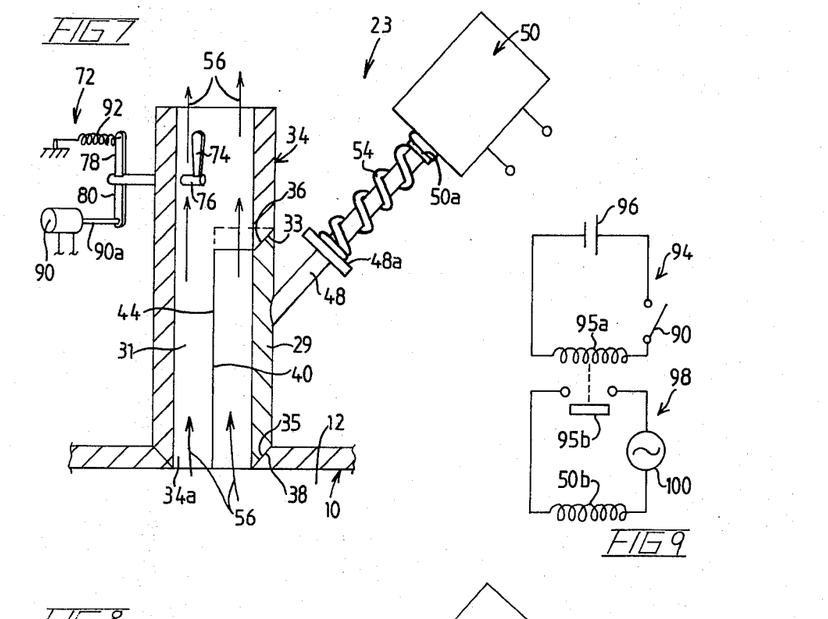
FIG. 7 is a cross-section showing part of the cyclone separator of FIG. 5, and outlet thereof, and the area varying means when conditioned in the same condition as FIG. 5.
FIG. 9 is an electric circuit diagram of electric control means associated with the area varying means.

In the condition of FIGS. 5 and 7, the cyclone separator can operate normally, one of two components of the liquid admitted via pipes 26 and 28 being delivered, as previously described, from the separating chamber cylindrical portion 12 through the outlet constituted by the pipe 34 and its interior opening 34a with the interior of chamber portion 12. The liquid flow under these conditions is shown by arrows 56.

Under the condition that the outlet constituted by pipe 34 and outlet opening 34a should become blocked, it is possible, by energizing of electromagnet 50, to withdraw the rod 48 into the body of the electromagnet against the resilient bias applied by spring 54. Under this condition, then, the segment 29 is correspondingly moved outwardly of the remainder 31 of the pipe 34 so that an enlarged opening 68 then defined by the aforementioned surfaces 36, 38, 44, 46 is provided for egress of material from the separator. By this means, obstructions such as stones or the like may be readily cleared from pipe 34 and/or opening 34a. The flow of such egress is indicated by the arrows 70 in FIGS. 6 and 8.

Figure 8:
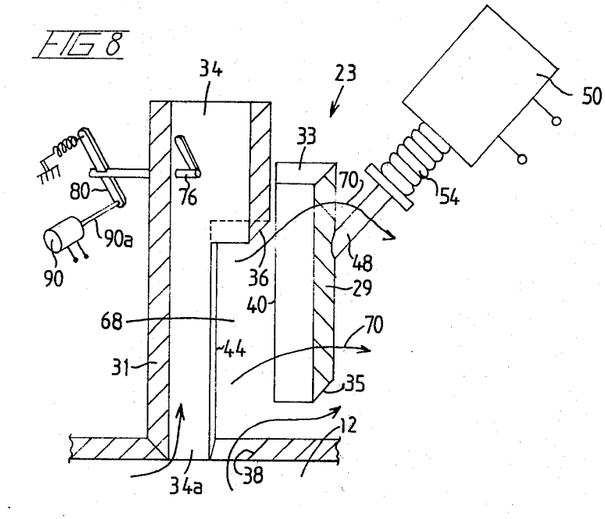
FIG. 8 is a view like FIG. 7 but showing the outlet area varying means in the condition of FIG. 6.

In order to provide for automatic operation, the area varying means of the invention may, as shown in FIGS. 7 and 8, include a flow sensitive device 72. Device 72 includes a light planar vane 74 positioned within pipe 34 and connected to a shaft 76 which is mounted for free rotation in a bearing (not shown) in the side wall of the pipe 34. Shaft 76 extends from an inner end within the pipe 34 exteriorly of the pipe 34. The shaft is mounted so that it is rotatable about an axis which extends generally radially to the direction of extent of the pipe 34. At its outer end, shaft 76 has two radial arms 78, 80 which extend oppositely therefrom. Arm 80 is located adjacent a free end of an operating button 90a of a switch 90. Arm 78 is connected, at its end remote from shaft 76, to a tension spring 92. Spring 92 is arranged to normally bias arm 78 and shaft 76 to a position such that arm 80 assumes the position shown in FIG. 8 at which the arm 80 is positioned at a limit distance away from the body of the switch 90. The operating button 90a of the switch 90 is resiliently biased away from the body of the switch and thus, at this condition is at an extreme extension from the body. Under this condition, the switch 90 is closed. It will be noted from FIG. 8, too, that the vane 74 is so located relative to the shaft 76 that under the condition of FIG. 8 the vane does not extend in the axial direction of the pipe 34 but is angularly displaced relative thereto.

Under the condition of flow through pipe 34, the flow so acts on vane 74 as to cause the shaft 76 to be rotated to the condition shown in FIG. 7. During this rotation, which occurs against spring bias of spring 92, the arm 80 is brought to bear on the button 90a so as to axially move the button towards the body of switch 90 at which condition the switch 90 is arranged to be open.

As shown in FIG. 9, the switch 90 is arranged in an electric circuit 94 so that when closed it operates to effect energization of a delay coil 94a from a low voltage source 96. Electric contacts 95b associated with a relay coil 95a are likewise arranged in an electric circuit 98 so that when closed the contacts ensure energization of the winding 50b of electromagnet 50 from an electric source 100. The arrangement is such that, under normal conditions of flow through pipe 34, switch 90 is not actuated, the vane 74 assuming the position shown in FIG. 7. Under conditions of flow blockage however, there will be reduced flow through pipe 34 with the result that there is insufficient fluid pressure to maintain the vane 74 in the generally axial direction of the pipe 34, against the bias of spring 92, whereupon the spring 92 operates as just described to rotate the shaft 76 and thereby effect closing of switch 90. Resultant operation of the electromagnet 50 causes withdrawal of the plunger 50a, so conditioning the means 23 as shown in FIG. 8 to permit clearance of the blockage. After clearance as shown in FIG. 8, resumption of flow through the pipe 34 will occur and the apparatus will be conditioned again to the condition of FIG. 7. In order to facilitate reversion back to the condition of FIG. 7, it is possible to modify the circuit of FIG. 9 to include timing and resetting means such that the contacts 95a remain closed only for a predetermined time following an initiation of closing pursuant to closing of switch 90.

Figure 10:
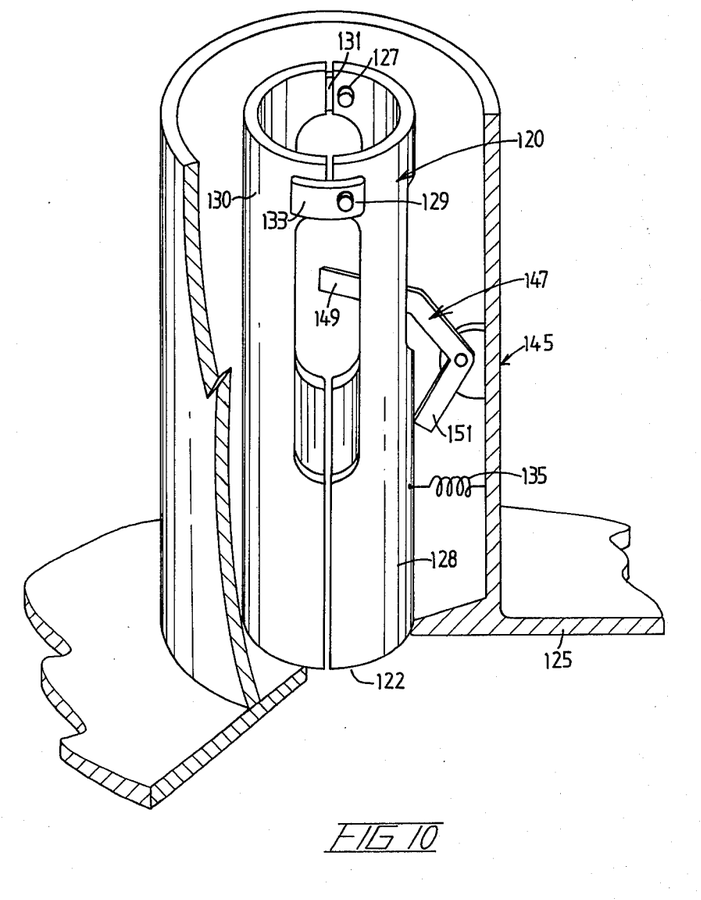
FIG. 10 is a partly sectioned perspective view of an alternative form of area varying means constructed in accordance with the invention.

Referring now to FIG. 10, a modified area varying means 124 is shown for use in conjunction with an outlet pipe 120 of a cyclone separator 110. The separator 110 is, aside from the different form of the area varying means 124, similar to the separator 10 previously described, the outlet pipe 120 corresponding in function generally to the outlet pipe 34 previously described, and extending away from an outlet opening 122 generally performing the same function as the outlet opening 34a previously described.

Figure 11:
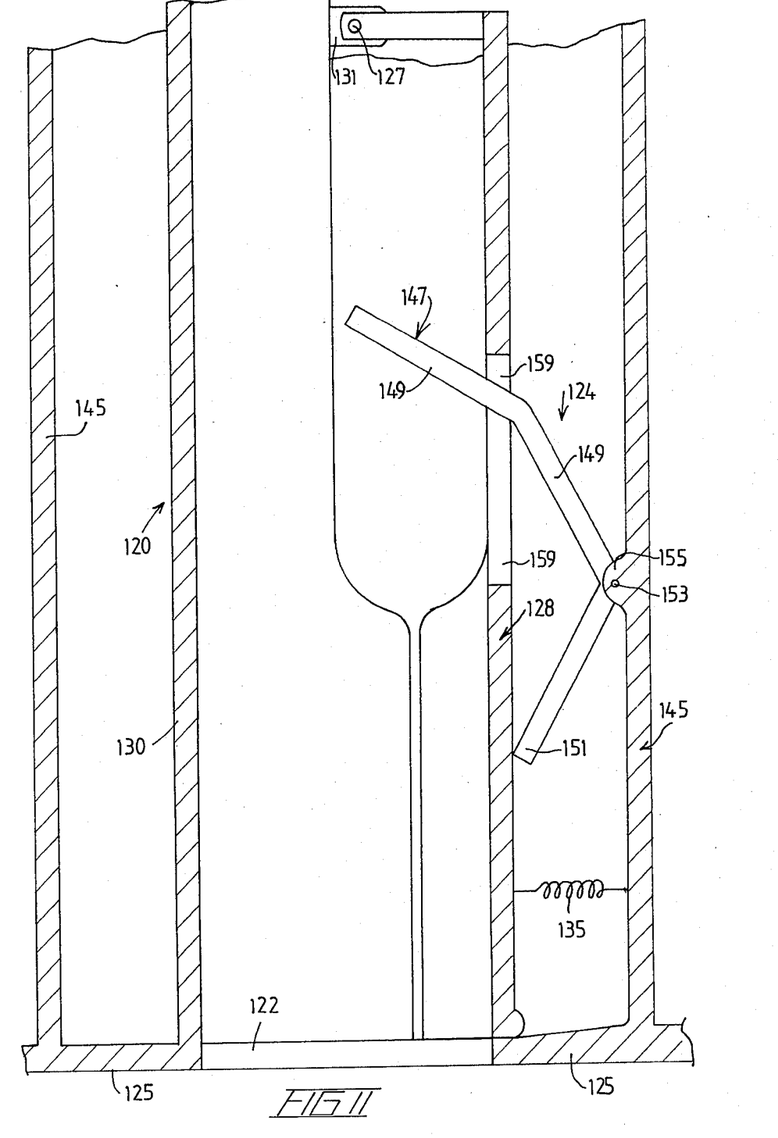
FIGS. 11 and 12 are cross-sectional views of the area varying means of FIG. 10 shown, respectively, in closed and open conditions.
Figure 12:
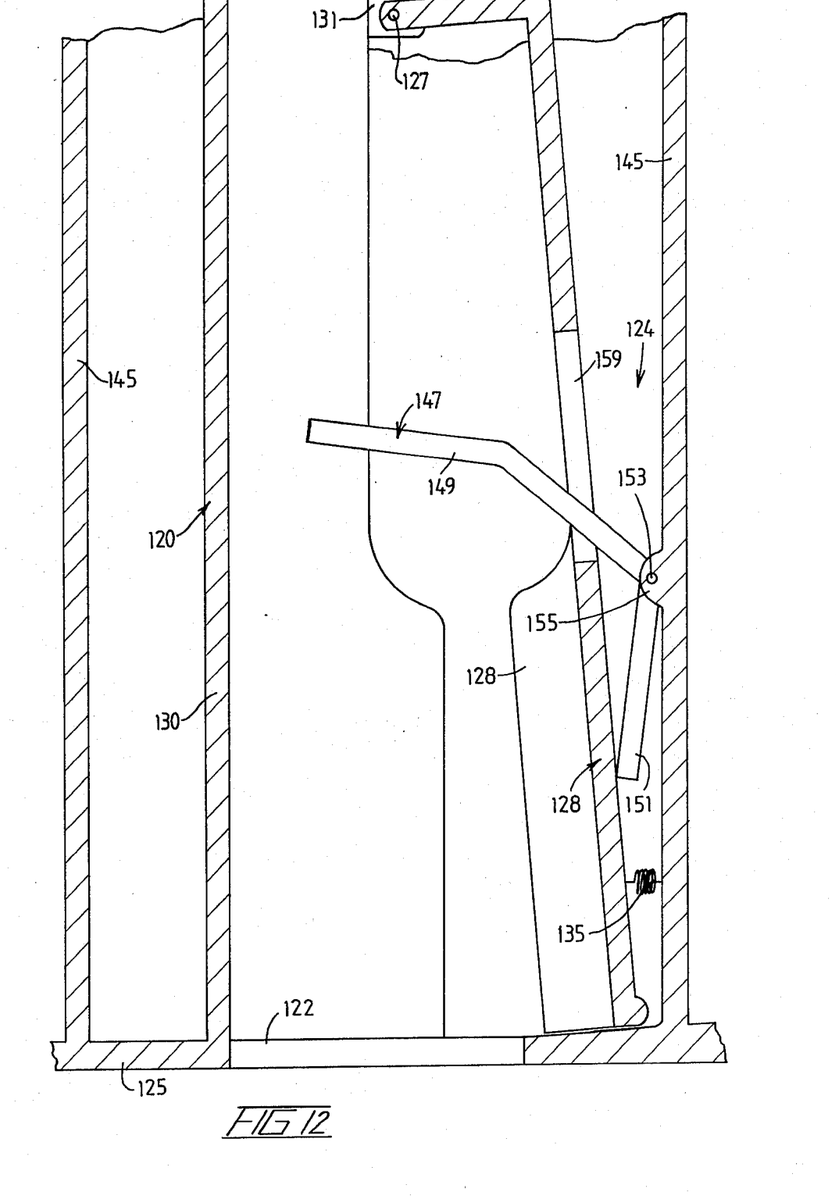

The pipe 120 has a movable portion 128 which forms one segment of the total periphery of the pipe and which is pivotally secured to the remainder 130 of the pipe. Remainder 130 is secured, such as by welding, to the end wall 125 of the separator, about opening 122. Portion 128 is pivoted, at a location downstream of opening 122, to the remainder 130 of pipe 120 by coaxial pivot pins 127, 129 which extend through lugs 131, 133 on the pipe remainder. At locations adjacent the outlet 122, the remainder 130 and pipe portion 128 are of generally arcuate configuration when viewed in cross-section, fitting together, in the operative position of the means 124, in the fashion shown in FIGS. 10 and 11 to define a substantially circular cross-sectioned flow path for fluid flow from outlet 122. As shown in FIG. 12, however, the portion 128 is swingable about the common axis of the pins 127, 129 so that, adjacent the opening 122, the portion 128 is swung outwardly to increase the space between the portion 128 and remainder 130 of pipe 120 so increasing the outflow area and permitting clearance of blockages.

A light helical tension spring 135 is provided between the lower end of portion 128 and an outer flow collecting pipe 145 secured to separator wall 125 in coaxial spaced relationship around pipe 120. Spring 135 provides a resilient bias so directed as to tend to cause the portion 128 to assume the open condition shown in FIG. 11. However, in normal use, with fluid flow through outlet 122 into the pipe 120, the portion 128 is held biased in its closed position by fluid pressure force acting on a lever 147. Lever 147 has two arms 149, 151 each radiating from a central portion of the lever. The lever is pivotally mounted to the pipe 145 at that central portion by means of a pin 153 passing through lugs 155 on the interior surface of the pipe 145. Arm 151 extends generally against the flow direction in pipe 130 from pin 153 to an outer end which engages the exterior of portion 128 at a location well away from its pivot axis about pins 127, 129. Arm 149 extends away from pin 153, through a clearance slot 159 in portion 128 and thence generally transversely across the interior of the pipe 120 between the portion 128 and the remainder 130 of the pipe.

In the absence of flow from outlet 122 through pipe 120, lever 147 is positioned as shown in FIG. 12, with the free end of the arm 151 against the exterior surface of portion 128. However, when flow occurs through the pipe 120 the flow impinges upon the arm 149 of lever 147 thus subjecting it to a pressure force which is directed away from the opening 122 in the direction of flow of the liquid through pipe 120. The force is arranged to be sufficient to cause movement of the arm 149 and thus of the lever 147 so that the lever is pivoted in the clockwise direction from the position as shown in FIG. 12, so that the pressure force acting on arm 149 is transferred through the lever to apply a force at the opposite end thereof, namely at the free end of arm 151, against portion 128 thus causing the portion to be pivoted, with corresponding pivotal movement of the lever 147, to close the gap between the portion 128 and the remainder 130. That is to say, the action is thus to move the portion 128 from the condition shown in FIG. 12 to that shown in FIG. 11, against the bias of spring 135. By this means, in normal use, the portion 128 is maintained closed, only opening under condition where, due to blockage, there is no flow through the pipe 120 whereupon the pressure force acting on arm 149 is reduced to the extent that the spring 135 can operate to bias the portion 128 open. This arrangement has the advantage that it has no electrical parts and is mechanically simple, whilst nevertheless operating automatically to increase the area for outflow of the fluid under blockage conditions and to again decrease the area for outflow to a normal condition on clearing the blockage.

Referring now to FIGS. 13 to 17, the modified area varying means 224 shown therein is for use in conjunction with an outlet pipe 220 of a cyclone separator, such as the separator 10. The outlet pipe 220 performs the function of the earlier described outlet pipe 34. The area varying means 224 has a circular plate 221 adapted for securement to a transverse end wall of the separator so that an outlet opening 222 through the plate 221 and leading to the interior of the pipe 220 then performs the function of the previously described outlet opening 34a.

Pipe 220 has a removable portion 228 which forms one segment of the total periphery of the pipe and which is pivotally secured to the remainder 230 of the pipe. The pivotal securement is effected by means of two lugs 233, 235 secured to the portion 228 and pivoted to the pipe remainder 230 by means of pivot pins 237 arranged on a common side-to-side pivot axis on the remainder 230. The pipe 220 has an interior bore extending from opening 222 to an outlet aperture 271 at the end of the pipe remote from plate 221. As best seen from FIGS. 16 and 17 this bore has two sections, a larger diameter bore section 273 adjacent opening 222 and a lesser diameter section 275 adjacent aperture 271. Remainder 230 of pipe 220 is formed with lengthwise extending surfaces 279, 281 which are disposed to opposite sides of bore section 275 and portion 228 has corresponding lengthwise extending surfaces 283, 285 which, in the closed condition of the area varying means, sealingly engage the respective surfaces 279, 281. The bore section 275 is, for one lengthwise extending half thereof, defined within remainder 230 and for the other lengthwise extending half, defined within portion 228. At a portion of the larger diameter bore section 273 adjacent the junction between sections 273 and 275, the portion 230 has a transverse, planar, somewhat U-shaped surface 287 which extends, at opposite ends of that surface to meet respective ones of the surfaces 279 and 281 and thence extends obliquely to the top of the outer surface of the remainder 230 as viewed in the sections of FIGS. 16 and 17. The U-shaped configuration of the surface 287 can, however, be appreciated from FIG. 15. The portion 228 has a similar U-shaped surface 289 which in the closed position of the area varying means engages with surface 287.

Figure 13:
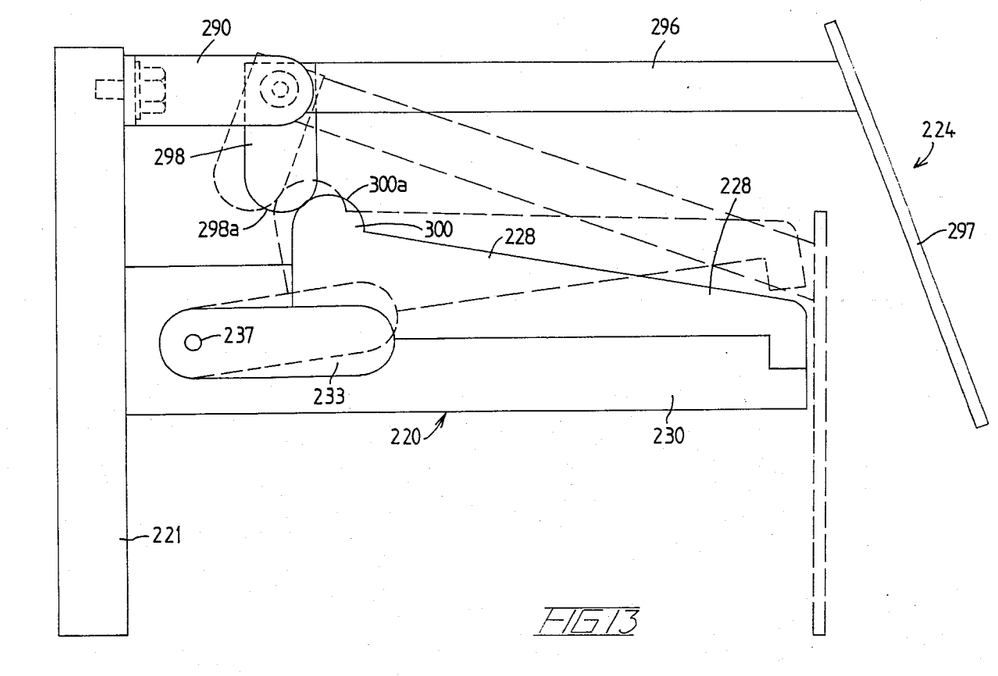
FIG. 13 is a side view of a still further form of area varying means constructed in accordance with the invention.

Plate 221 carries a generally U-shaped bracket 290 and a shaft 292 extends between the opposed arm portions thereof and is retained therein so as to be freely rotatable about an axis extending transversely of the pipe 220 and generally parallel to the plane containing surfaces 279, 281. Shaft 292 has secured thereto two elongate arms 294, 296 which extend away from the shaft to free ends positioned over the end of pipe 220 remote from opening 222. A plate 297 is secured to the free ends of the arms 294, 296 and extends generally transversely thereto to the directions of extent of the arms. Intermediate the ends of the shaft 292, the shaft is provided with a downwardly depending cam element 298 which is secured for rotation with the shaft. Cam element 298 has a lower cam surface 298a which is of arcuate form and which co-operates with an arcuately curved cam surface 300a on a projection 300 extending upwardly from portion 228.

Figure 16:
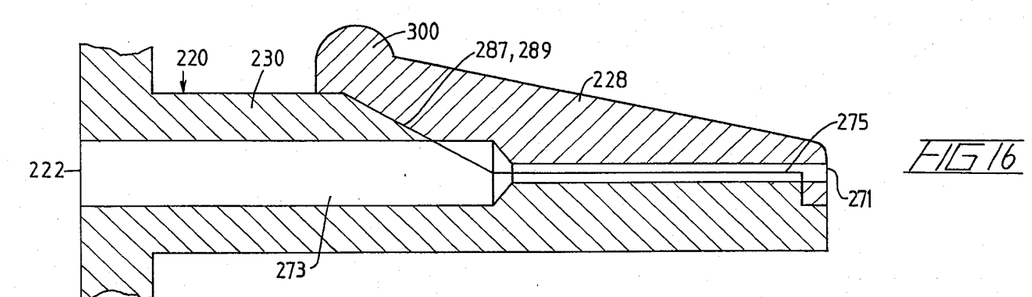
FIGS. 16 and 17 are respective axial cross-sections of the area varying means of FIG. 13, in two different operative conditions.
Figure 17:
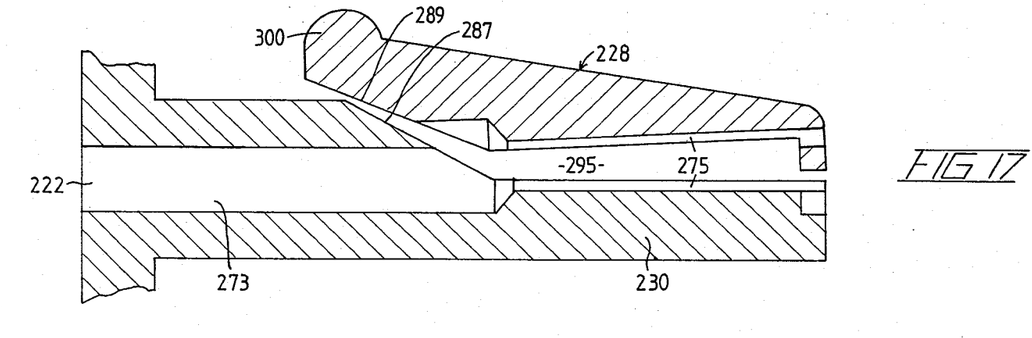

In normal operation of the device 224 the portion 228 occupies the position shown in FIGS. 13 and 16 where the portion 228 is engaged with the remainder 230 so as to fully define the two bore sections 273, 275. Liquid leaving the cyclone separator passes through opening 222 thence through bore section 273 and then through bore section 275 to exit via aperture 271. The bore section 275 is of relatively small diameter to provide proper operation of the separator. Liquid egressing from aperture 271 strikes plate 297 and exerts sufficient force thereon to normally cause the arms 294, 296 to pivot such that the plate 297 is held away from the aperture 271, as shown in FIG. 13. Under this condition, the cam surface 298a on element 298 engages cam surface 300a on portion 228 in such a fashion as to cause force exerted by the egressing liquid on the plate 296 and transferred through the arms 294, 296 to the element 298, to press on the portion 228 so maintaining it in the position of FIGS. 13 and 16. Under the condition, however, where blockage of outlet 222 occurs and there is reduced flow through the bore sections 273 and 275, the force exerted by liquid emerging from aperture 271 will be insufficient to maintain the plate 297 clear of the aperture whereupon arms 294, 296 pivot clockwise as shown in FIG. 13 so that plate 297 moves downwardly as viewed in FIG. 13. This causes the cam surface 298a to be moved, by corresponding clockwise pivoting of element 298, away from cam surface 300a, thus removing constraint against pivoting of the portion 228 about the axis of pins 237. Under this condition, then, liquid pressure in the bore section 273 may bear against the portion 228 in such a fashion as to effect anti-clockwise pivoting of portion 228 as viewed in FIG. 13 so as to bring portion 228 to the condition shown in FIG. 17 whereupon the surfaces 279, 281 and 287 on remainder 230 of pipe 220 are well cleared from the corresponding surfaces 283, 285 and 289 on portion 228, so as to present a substantial gap therebetween, such gap being indicated by reference numeral 295 in FIG. 17. Thus, material causing a blockage in the outlet 222 may be readily cleared by outflow of liquid through that gap. Once such clearance has occured, the portion 228 may revert to the initial condition shown in FIG. 16 under gravitational action, accompanied by clockwise rotation about the axis of the pins 237. If desired, in order to facilitate the return action, a resilient tension spring may be provided acting between portion 228 and remainder 230. Alternatively, in order to facilitate the action of the cam surface 298a on a spring may be provided between the projection and say, the plate 221 to lightly bias the element 298 for clockwise rotation about the axis of shaft 292.

Figure 14:
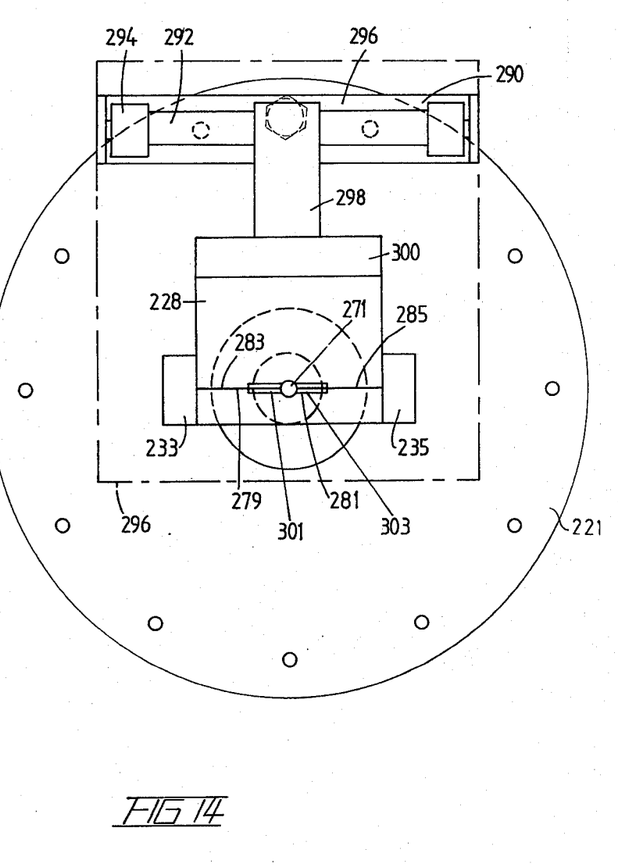
FIG. 14 is an end view of the area varying means of FIG. 13.
Figure 15:
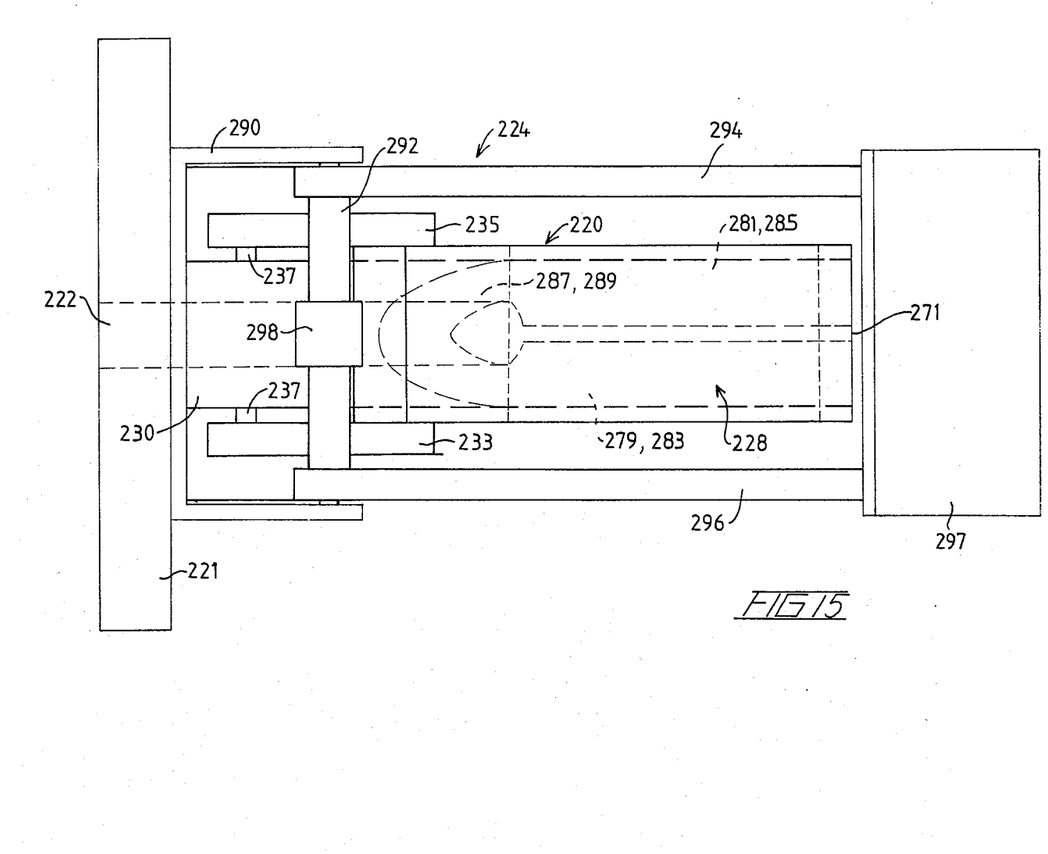
FIG. 15 is a plan view of the area varying means of FIG. 13.

In order to improve sealing between portion 228 and remainder 230 of pipe 220, the surfaces 279, 281 and 287 thereof may have suitable sealant strips positioned therein. Two such strips, designated by respective reference numerals 301, 303, are shown in FIG. 14 as set in to surfaces 279, 281. The strips may be formed, for example, of neoprene.

The described arrangement has been advanced merely by way of explanation and many modifications may be made thereto without departing from the spirit and scope of the invention which includes every novel feature and combination of novel features herein disclosed.

I claim:

1. A cyclone separator comprising elements designed, sized and arranged for treating an oil-water mixture for separating the more dense water component from the less dense oil component thereof, said separator having a separating chamber with first, second and third contiguous cylindrical portions arranged in that order, the first cylindrical portion being of greater diameter than the second cylindrical portion and the third cylindrical portion being of lesser diameter than the second cylindrical portion, the second cylindrical portion being of a length which is at least ten times its diameter adjacent the first cylindrical portion, the first cylindrical portion having an overflow outlet at the end thereof opposite to said second cylindrical portion and at least one tangentially directed feed inlet, said separator further including means designed, sized and arranged for acting to preclude contamination of the water component emerging from the third cylindrical portion by said oil component, said means being in the form of a fourth portion of the separating chamber, which fourth portion presents a passageway for throughflow of said water component, the diameter of which passageway decreases away from said third cylindrical portion to a diameter in the range ⅓ to ⅔ of the diameter of the fourth portion at the junction of said fourth portion with said third cylindrical portion.

2. A cyclone separator as claimed in claim 1 wherein said fourth portion has a portion adjacent the third portion which exhibits a decreasing diameter along its length away from the third cylindrical portion to an outlet aperture at the end of that part remote from the said third cylindrical portion.

3. A cyclone separator as claimed in claim 2 wherein said fourth portion includes an outlet pipe extending from said outlet aperture.

4. A cyclone separator as claimed in claim 3 wherein the outlet pipe is of cylindrical form having a diameter which is substantially constant.

5. A cyclone separator as claimed in claim 2 wherein said part of the fourth portion is of generally frustoconical configuration having a maximum diameter adjacent the junction with said third cylindrical portion and equal to the diameter of the third cylindrical portion at that junction.

6. A cyclone separator as claimed in claim 5 wherein the half angle or angle of the interior surface of said part of the fourth portion as measured to the axis of the fourth portion is substantially 45°.

7. A cyclone separator as claimed in claim 2 wherein said part of the fourth portion is approximately as long as it is in diameter at its maximum diameter end.

8. A cyclone separator as claimed in claim 1 wherein $$10 \leq l_2/d_2 \leq 25$$

$$0.04 \leq 4A_i/11d_1d_2 \leq 0.10$$

$$[0.1 \leq d_0/d_2 \leq 0.25]$$

$$d_1 > d_2$$

$$d_2 > d_3$$

wherein, $d_1$ is the diameter of the first portion, $d_2$ is the diameter of the second portion and $d_3$ is the diameter of the third portion, $l_2$ is the length of the second portion, $A_i$ is the total cross sectional area of all the feed inlets measured at the points of entry into the separating chamber normal to the inlet flow.

9. A cyclone separator as claimed in claim 1 wherein said fourth portion is provided with flow inhibiting baffles or other flow resistance elements.

10. A cyclone separator as claimed in claim 1 wherein said fourth portion is provided with porous flow resistance means.

11. A cyclone separator as claimed in claim 1 wherein control means is provided for sensing liquid pressure in the cyclone separator and responsive to that pressure for varying the degree of resistance to flow presented by said fourth portion.

12. A cyclone separator as claimed in claim 11 wherein the control means is responsive to decrease the flow resistance when there is a rise in sensed pressure and to increase the resistance when there is a drop is sensed pressured.

13. A cyclone separator as claimed in claim 12 wherein the wall of the fourth portion is flexible and means is provided for exerting external pressure on the wall to effect deformation thereof, thus to effect said varying of said degree of resistance to flow.

14. A cylone separator comprising elements designed, sized and arranged for treating an oil-water mixture for separating the more dense water component from the less dense oil component thereof, said separator having a separating chamber with first, second and third contiguous cylindrical portions arranged in that order, the first cylindrical portion being of greater diameter than the second cylindrical portion and the third cylindrical portion being of lesser diameter than the second cylindrical portion, the second cylindrical portion being of a length which is at least ten times its diameter adjacent the first cylindrical portion, the first cylindrical portion having an overflow outlet at the end thereof opposite to said second cylindrical portion and at least one tangentially directed feed inlet, said separator further including means designed, sized and arranged for acting to preclude contamination of the water component emerging from the third cylindrical portion by said oil component, said means comprising a constriction at the end of the separating chamber opposite said overflow outlet, said constriction presenting a passageway for throughflow of said water component, the diameter of which passageway decreases away from said third cylindrical portion to a diameter in the range ⅓ to ⅔ of the diameter of the passageway at the end of said constriction closest said third cylindrical portion.

15. A cyclone separator as claimed in claim 14, wherein $$10 \leq l_2/d_2 \leq 25$$

$$0.04 \leq 4A_i/11d_1d_2 \leq 0.10$$

$$d_1 > d_2$$

$$d_2 > d_3$$

wherein, $d_1$ is the diameter of the first portion, $d_2$ is the diameter of the second portion and $d_3$ is the diameter of the third portion, $l_2$ is the length of the second portion, $A_i$ is the total cross-sectional area of all the feed inlets measured at the points of entry into the separating chamber normal to the inlet flow.

16. A cyclone separator comprising elements designed, sized and arranged for treating an oil-water mixture for separating the more dense water component from the less dense oil component thereof, said separator having a separating chamber with first, second and third contiguous cylindrical portions arranged in that order, the first cylindrical portion being of greater diameter than the second cylindrical portion and the third cylindrical portion being of lesser diameter than the second cylindrical portion, the second cylindrical portion being of a length which is at least ten times its diameter adjacent the first cylindrical portion, the first cylindrical portion having an overflow outlet at the end thereof opposite to said second cylindrical portion and at least one tangentially directed feed inlet, said separator further including means designed, sized and arranged for acting to preclude contamination of the water component emerging from the third cylindrical portion by said oil component, said means being in the form of a fourth portion of the separating chamber, which fourth portion presents a passageway for throughflow of said water component, the diameter of which passageway decreases away from said third cylindrical portion to a diameter in the range of $\frac{1}{8}$ to $\frac{5}{8}$ of the diameter of the fourth portion at the junction of said fourth portion with said third cylindrical portion, and the outlet is provided with means selectively operable to vary the cross-sectional area of said outlet for permitting clearing of a blockage when occurring in the outlet.

17. A cyclone separator as claimed in claim 16 wherein flow sensitive means is provided positioned and operable for detecting a decrease in flow through said outlet and for operating said area varying means for increasing the cross-sectional area for said clearing.

18. A cyclone separator as claimed in claim 17 wherein said outlet is in the form of an outlet pipe and the cross-sectional area varying means comprises a mechanism including a portion of the wall of the pipe which is so movable as to open the side of the pipe to the exterior thereof.

19. A cyclone separator as claimed in claim 18 wherein said portion is a side segment of the pipe which is movable outwardly away from the remainder of the pipe under influence of said mechanism.

20. A cyclone separator as claimed in claim 19 wherein said mechanism includes an electromagnet and the said flow sensitive means operates to apply electric current to said electromagnet for effecting movement of the segment away from the remainder of the pipe on said detecting of decrease in flow.

21. A cyclone separator as claimed in claim 18 wherein the pipe wall portion is pivotally movable away from the remainder of the pipe.

22. A cyclone separator as claimed in claim 21 wherein the pipe wall portion is arranged to be subject, in use, to a bias towards a position effecting said opening of the side of the pipe, and flow sensitive means is provided, positioned to be normally acted upon directly by flow through the pipe to impart a force thereon which is directed against the outlet pipe wall portion to maintain it closed, said force, however, being reduced in the case of reduced flow through the pipe due to blockage whereby the aforementioned bias effects movement to open the side of the pipe.

23. A cyclone separator as claimed in claim 22 wherein the flow sensitive means comprises a pivotal lever having two arms extending from a location at which the lever is pivotal to said remainder of said pipe, one said arm being formed with means in use subjected flow thereonto from the separator and the other engaging the said pipe wall portion.

24. A cyclone separator comprising elements designed, sized and arranged for treating an oil-water mixture for separating the more dense water component from the less dense oil component thereof, said separator having a separating chamber with first, second and third contiguous cylindrical portions arranged in that order, the first cylindrical portion being of greater diameter than the second cylindrical portion and the third cylindrical portion being of lesser diameter than the second cylindrical portion, the second cylindrical portion being of a length which is at least ten times its diameter adjacent the first cylindrical portion, the first cylindrical portion having an overflow outlet at the end thereof opposite to said second cylindrical portion and at least one tangentially directed feed inlet, said separator further including means designed, sized and arranged for acting to preclude contamination of the water component emerging from the third cylindrical portion by said oil component, said means comprising a constriction at the end of the separating chamber opposite said overflow outlet, said constriction presenting a passageway for throughflow of said water component, the diameter of which passageway decreases away from said third cylindrical portion to a diameter in the range of $\frac{1}{8}$ to $\frac{5}{8}$ of the diameter of the passageway at the end of said constriction closest said third cylindrical portion, and said outlet is provided with means selectively operable to vary the cross-sectional area of said outlet for permitting clearing of a blockage when occurring in the outlet.

25. A cyclone separator as claimed in claim 24, wherein flow sensitive means is provided positioned and operable for detecting a decrease in flow through said outlet and for operating said area varying means for increasing the cross-sectional area for said clearing.

26. A cyclone separator as claimed in claim 25, wherein said outlet is in the form of an outlet pipe and the cross-sectional area varying means comprises a mechanism including a portion of the walls of the pipe which is so movable as to open the side of the pipe to the exterior thereof.

27. A cyclone separator as claimed in claim 26, wherein said portion is a side segment of the pipe which is movable outwardly away from the remainder of the pipe under influence of said mechanism.

28. A cyclone separator as claimed in claim 27, wherein said mechanism includes an elecromagnet and said flow sensitive means operates to apply electric current to said electromagnet for effecting movement of the segment away from the remainder of the pipe on said detecting of decrease in flow.

29. A cyclone separator as claimed in claim 26, wherein the pipe wall portion is pivotally movable away from the remainder of the pipe.

30. A cyclone separator as claimed in claim 29, wherein the pipe wall portion is arranged to be subject, in use, to a bias towards a position effecting said opening of the side of the pipe, and flow sensitive means is provided, positioned to be normally acted upon directly by flow through the pipe to impart a force thereon which is directed against the outlet pipe wall portion to maintain it closed, said force, however, being reduced in the case of reduced flow through the pipe due to blockage whereby said aforementioned bias effects movement to open the side of the pipe.

31. A cyclone separator as claimed in claim 30, wherein the flow sensitive means comprises a pivotal lever having two arms extending from a location at which the lever is pivotal to said remainder of said pipe, one said arm being formed with means in use subjected flow thereonto from the separator and the other engaging said pipe wall portions.

* * * * *